United States Patent
Peng et al.

(10) Patent No.: US 10,411,536 B2
(45) Date of Patent: Sep. 10, 2019

(54) MOTOR ROTOR AND MOTOR HAVING SAME

(71) Applicants: GUANGDONG WELLING MOTOR MANUFACTURING CO., LTD., Foshan (CN); MIDEA WELLING MOTOR TECHNOLOGY (SHANGHAI) CO., LTD., Shanghai (CN)

(72) Inventors: Guangming Peng, Shanghai (CN); Fei Wang, Shanghai (CN); Lidan Zhao, Shanghai (CN); Jintao Chen, Shanghai (CN); Z. Q. Zhu, Shanghai (CN)

(73) Assignee: GUANGDONG MEIZHI COMPRESSOR CO., LTD., Foshan (CN)

( * ) Notice: Subject to any disclaimer, the term of this patent is extended or adjusted under 35 U.S.C. 154(b) by 341 days.

(21) Appl. No.: 15/328,940

(22) PCT Filed: Jul. 31, 2014

(86) PCT No.: PCT/CN2014/083435
§ 371 (c)(1),
(2) Date: Jan. 25, 2017

(87) PCT Pub. No.: WO2016/015289
PCT Pub. Date: Feb. 4, 2016

(65) Prior Publication Data
US 2017/0250583 A1   Aug. 31, 2017

(51) Int. Cl.
*H02K 1/14* (2006.01)
*H02K 1/27* (2006.01)

(52) U.S. Cl.
CPC .............. *H02K 1/276* (2013.01); *H02K 1/146* (2013.01); *H02K 2201/03* (2013.01); *H02K 2213/03* (2013.01)

(58) Field of Classification Search
CPC . H02K 1/276; H02K 2201/03; H02K 2213/03
See application file for complete search history.

(56) References Cited

U.S. PATENT DOCUMENTS

| | | | | | |
|---|---|---|---|---|---|
| 5,369,325 | A | * | 11/1994 | Nagate | H02K 1/2746 310/156.54 |
| 8,405,269 | B2 | * | 3/2013 | Spaggiari | H02K 1/276 310/156.45 |
| 2008/0203842 | A1 | | 8/2008 | Yoshikawa et al. | |

FOREIGN PATENT DOCUMENTS

| | | |
|---|---|---|
| CN | 101330231 A | 12/2008 |
| CN | 102214958 A | 10/2011 |

(Continued)

OTHER PUBLICATIONS

ISA/CN, International Search Report for PCT/CN2014/083435, May 6, 2015.

(Continued)

*Primary Examiner* — Dang D Le
(74) *Attorney, Agent, or Firm* — Scully Scott Murphy & Presser

(57) ABSTRACT

An electric motor rotor (100) and an electric motor having the same are provided. The electric motor rotor (100) includes a rotor body (1) provided with a rotor bore (11) and a plurality of magnetic steel slots (12) surrounding the rotor bore (11), in which an outer contour of the rotor body (1) includes a plurality of concentric arc segments (101) in concentric with the rotor bore (11) and a plurality of connecting line segments (102) connecting adjacent concentric arc segments (101), and the connecting line segment (102) includes at least one straight line segment (1021), in which an included angle β between a central normal line of each straight line segment (1021) and a connecting line between (Continued)

a midpoint of the straight line segment (1021) and a center of the rotor bore (11) satisfies 0°≤β≤20°; and a plurality of magnetic steel bars (2).

18 Claims, 2 Drawing Sheets

(56) References Cited

FOREIGN PATENT DOCUMENTS

| CN | 202435162 U | 9/2012 |
|---|---|---|
| CN | 102916544 A | 2/2013 |
| CN | 104158322 A | 11/2014 |
| JP | 2000197292 | 7/2000 |
| JP | 2004007875 | 1/2004 |
| JP | 2006238667 | 9/2006 |
| JP | 2012254019 | 12/2012 |
| JP | 2013132172 | 7/2013 |

OTHER PUBLICATIONS

IP Australia, Examination report No. 1 for standard patent application for AU2014402196, dated Sep. 18, 2017.
The State Intellectual Property Office of People's Republic of China, First Office Action for CN201410374844.2, dated Sep. 30, 2016.
ISA/CN, International Search Report and Written Opinion for PCT/CN2014/083435, dated May 6, 2015.
JPO, Office Action for JP Application No. 2017525663, dated Mar. 22, 2018.
APO, Office Action for AU Application No. 2014402196, dated Apr. 20, 2018.
EPO, Office Action for EP Application No. 14898787, dated Mar. 5, 2018.

\* cited by examiner

MOTOR ROTOR AND MOTOR HAVING SAME

CROSS-REFERENCE TO RELATED APPLICATION

The present application is a national phase entry under 35 USC § 371 of International Application PCT/CN2014/083435, filed Jul. 31, 2014, and the entire disclosure of which is incorporated herein by reference.

FIELD

The present disclosure relates to a technical field of electric motors, and more particularly to an electric motor rotor and an electric motor having the same.

BACKGROUND

A conventional interior permanent-magnet electric motor has the following problems:

1. The electric motor has a large cogging torque and a large electromagnetic torque ripple;
2. A back electromotive force has a high harmonic content, especially a high low-frequency harmonic content;
3. The electric motor has a large quadrature axis inductance and a low power factor of the electric motor, which causes a large controller capacity and a high cost;
4. The electric motor has a low efficiency;
5. The electric motor generates great noise and vibration.

In this regard, provided is an improved solution where a center of an inner circular arc end-face of a stator tooth and a center of an outer circular arc of a rotor are both deviated from a center of a rotor bore. This solution solves the first and second problems, but still has defects. Specifically, eccentricity of a stator inner circular arc will reduce an area of a stator slot and decrease the number of turns of the electric motor, thus affecting an efficiency of the electric motor; additionally, an increase in tooth harmonics intensifies radial vibration, thereby aggravating electromagnetic vibration and noise.

SUMMARY

The present disclosure aims to solve at least one of the problems existing in the related art. Therefore, embodiments of the present disclosure provide an electric motor rotor, which is conductive to reducing harmonics of a back electromotive force, a cogging torque of an electric motor, and an electromagnetic torque ripple.

The present disclosure further provides an electric motor having the above electric motor rotor.

According to embodiments of a first aspect of the present disclosure, the electric motor rotor includes: a rotor body provided with a rotor bore and a plurality of magnetic steel slots surrounding the rotor bore, in which an outer contour of the rotor body includes a plurality of concentric arc segments in concentric with the rotor bore and a plurality of connecting line segments connecting adjacent concentric arc segments, the plurality of concentric arc segments are respectively corresponding to the plurality of magnetic steel slots in a radial direction, and the connecting line segment includes at least one straight line segment, in which an included angle β between a central normal line of each straight line segment and a connecting line between a midpoint of the straight line segment and a center of the rotor bore satisfies 0°≤β≤20°; and a plurality of magnetic steel bars, in which at least one magnetic steel bar is provided in each of the plurality of magnetic steel slots.

For the electric motor rotor according to embodiments of the present disclosure, since the outer contour of the rotor body includes the plurality of concentric arc segments and the plurality of connecting line segments connecting adjacent concentric arc segments, a harmonic content of the back electromotive force of the electric motor may be decreased, and the cogging torque and the electromagnetic torque ripple thereof may be reduced.

In some embodiments of the present disclosure, a central angle α of the concentric arc segment satisfies α=360/P*θ, in which P represents the number of rotor poles, and 0<θ≤0.8.

In some embodiments of the present disclosure, the connecting line segment includes at least two straight line segments.

In some embodiments of the present disclosure, a magnetic bridge is defined between two ends of each magnetic steel slot and the connecting line segment adjacent to the ends of the magnetic steel slot, and a thickness T of the magnetic bridge has a range of 0.3 mm≤T≤1.0 mm.

In some embodiments of the present disclosure, a plurality of slits are formed between the magnetic steel slot and its corresponding concentric arc segment, and are spaced apart from one another. By providing the slits, it is possible to reduce a quadrature axis inductance and a capacity of the electric motor, thus lowering the cost.

Alternatively, the plurality of slits is symmetrical relative to a connecting line between a midpoint of the concentric arc segment and the center of the rotor bore.

In some embodiments of the present disclosure, two slits are provided.

In some embodiments of the present disclosure, the two slits are both parallel to the connecting line between the midpoint of the concentric arc segment and the center of the rotor bore.

In some embodiments of the present disclosure, a distance L between the two slits and a distance Lm between two ends of the magnetic steel bar in the magnetic steel slot satisfy L=Lm*k, in which 0.2≤k≤0.8.

In some embodiments of the present disclosure, respective first ends of the two slits adjacent to the concentric arc segment are inclined towards the connecting line between the midpoint of the concentric arc segment and the center of the rotor bore.

In some embodiments of the present disclosure, a distance between the respective first ends of the two slits adjacent to the concentric arc segment is denoted as L1, and a distance between respective second ends of the two slits adjacent to the magnetic steel slot is denoted as L2, in which 0.5≤L1/L2≤0.8.

Further, the distance Lm between the two ends of the magnetic steel bar in the magnetic steel slot satisfies L2=Lm*k, in which 0.2≤k≤0.8.

In some embodiments of the present disclosure, a distance between the first end of the slit adjacent to the concentric arc segment and the concentric arc segment is denoted as H1, and a distance between the second end of the slit adjacent to the magnetic steel slot and the magnetic steel slot is denoted as H2, in which 0.3 mm≤H1≤0.6 mm and 0.3 mm≤H2≤0.6 mm.

In some embodiments of the present disclosure, the magnetic steel slot has an elongated shape and is perpendicular to a connecting line between a midpoint of the concentric arc segment and the center of the rotor bore, and each of the plurality of magnetic steel slots has one magnetic steel bar therein.

For the electric motor rotor according to embodiments of the present disclosure, the outer contour of the rotor body includes the plurality of concentric arc segments and the plurality of connecting line segments, and meanwhile the slits are provided between the magnetic steel slot and its corresponding concentric arc segment, so that it is possible to suppress tooth harmonics and reduce electromagnetic vibration of the electric motor.

An electric motor according to embodiments of a second aspect of the present disclosure includes: an electric motor stator provided with a stator bore and a plurality of stator slots surrounding the stator bore, in which the stator slots are in communication with the stator bore, and a stator tooth is defined between adjacent stator slots; and an electric motor rotor according to embodiments of the first aspect of the present disclosure, in which the electric motor rotor is rotatably disposed in the stator slots, and the rotor bore is in concentric with the stator bore.

Since the electric motor includes the electric motor rotor described in the above embodiments, the harmonic content of the back electromotive force of the electric motor may be decreased, and the cogging torque and the electromagnetic torque ripple of the electric motor may be reduced; additionally, the harmonic content of the back electromotive force of the electric motor and the quadrature axis inductance thereof are decreased; and furthermore, the tooth harmonics may be suppressed, thereby reducing the electromagnetic vibration of the electric motor.

In some embodiments of the present disclosure, a radial inner end face of the stator tooth is formed as an arc end face in concentric with a center of the stator bore. Therefore, on the premise of reducing the cogging torque and the electromagnetic torque ripple of the electric motor, a slot area of the electric motor is not decreased, such that the number of winding turns does not need to be reduced, thereby improving an efficiency of the electric motor.

In some embodiments of the present disclosure, the number S of stator slots and the number P of rotor poles of the electric motor rotor satisfy P/S=2/3.

Additional aspects and advantages of embodiments of present disclosure will be given in part in the following descriptions, become obvious in part from the following descriptions, or be learned from the practice of embodiments of the present disclosure.

BRIEF DESCRIPTION OF THE DRAWINGS

These and other aspects and advantages of embodiments of the present disclosure will become obvious and more readily appreciated from the following descriptions made with reference to the drawings, in which.

Figure 1:
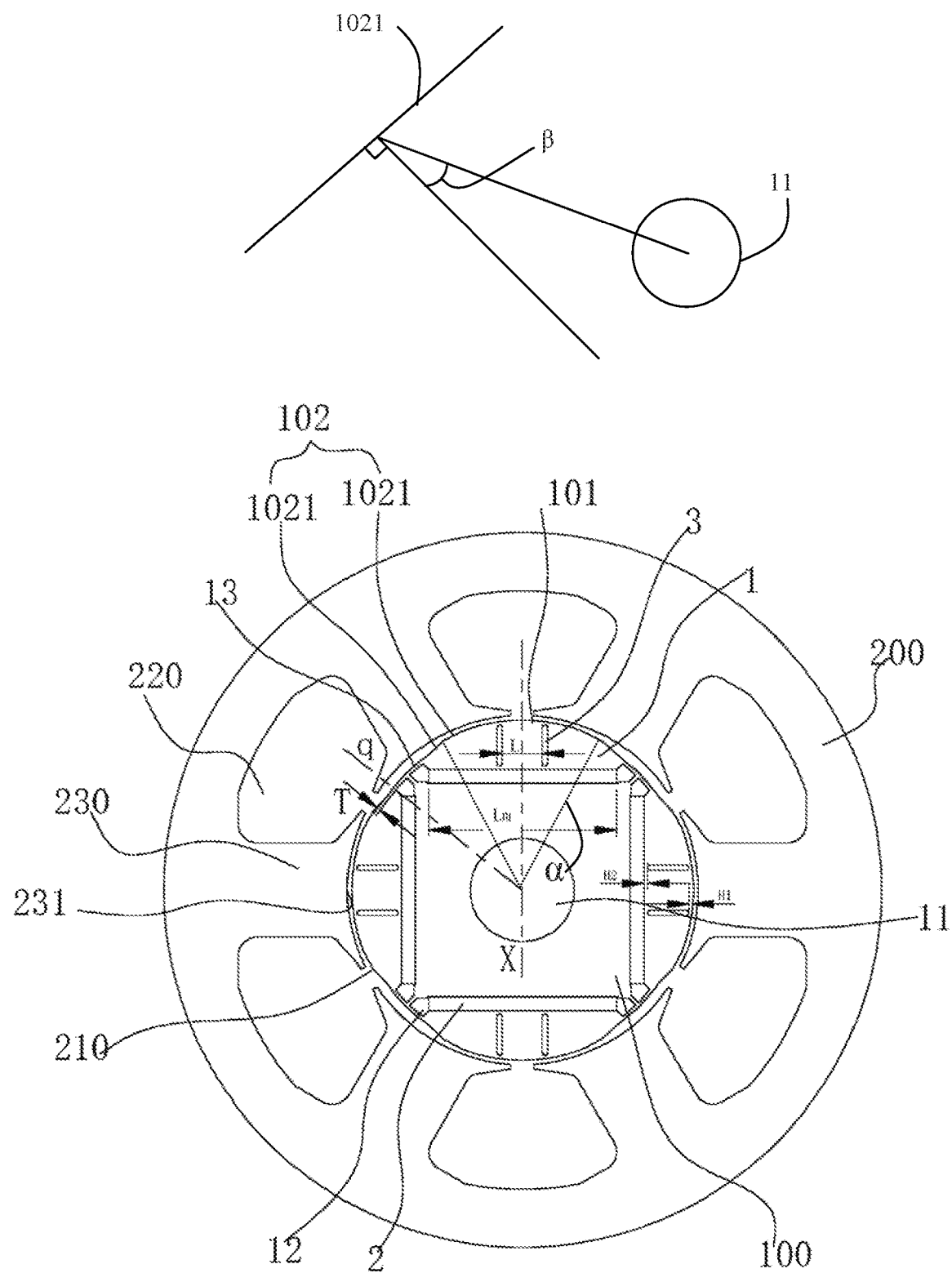
FIG. 1 is a schematic view of an electric motor according to an embodiment of the present disclosure.

REFERENCE NUMERALS electric motor rotor 100;
rotor body 1; rotor bore 11; magnetic steel slot 12; concentric arc segment 101; connecting line segment 102;
magnetic steel bar 2; slit 3;
connecting line X between midpoint of concentric arc segment 101 and center of rotor bore 11;
electric motor stator 200; stator bore 210; stator slot 220; stator tooth 230; radially inner end face 231 of stator tooth.

DETAILED DESCRIPTION

Embodiments of the present disclosure will be described in detail and examples of the embodiments will be illustrated in the drawings, in which same or similar reference numerals are used to indicate same or similar members or members with same or similar functions throughout the specification. The embodiments described herein with reference to drawings are explanatory, which are used to illustrate the present disclosure, but shall not be construed to limit the present disclosure.

In the specification, it is to be understood that terms such as "center," "thickness," "inner," "outer," "axial," "radial," and "circumferential" should be construed to refer to the orientation as then described or as shown in the drawings under discussion. These relative terms are for convenience and simplification of description of the present disclosure, and do not alone indicate or imply that the device or element referred to must have a particular orientation, and must be constructed or operated in a particular orientation, thus it should not be construed to a limit to the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, it should be noted that unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

An electric motor rotor 100 according to embodiments of a first aspect of the present disclosure will be described below with reference to FIGS. 1 to 2, and the electric motor rotor 100 is used in an electric motor.

The electric motor rotor 100 according to embodiments of the present disclosure includes a rotor body 1 and a plurality of magnetic steel bars 2.

Figure 2:
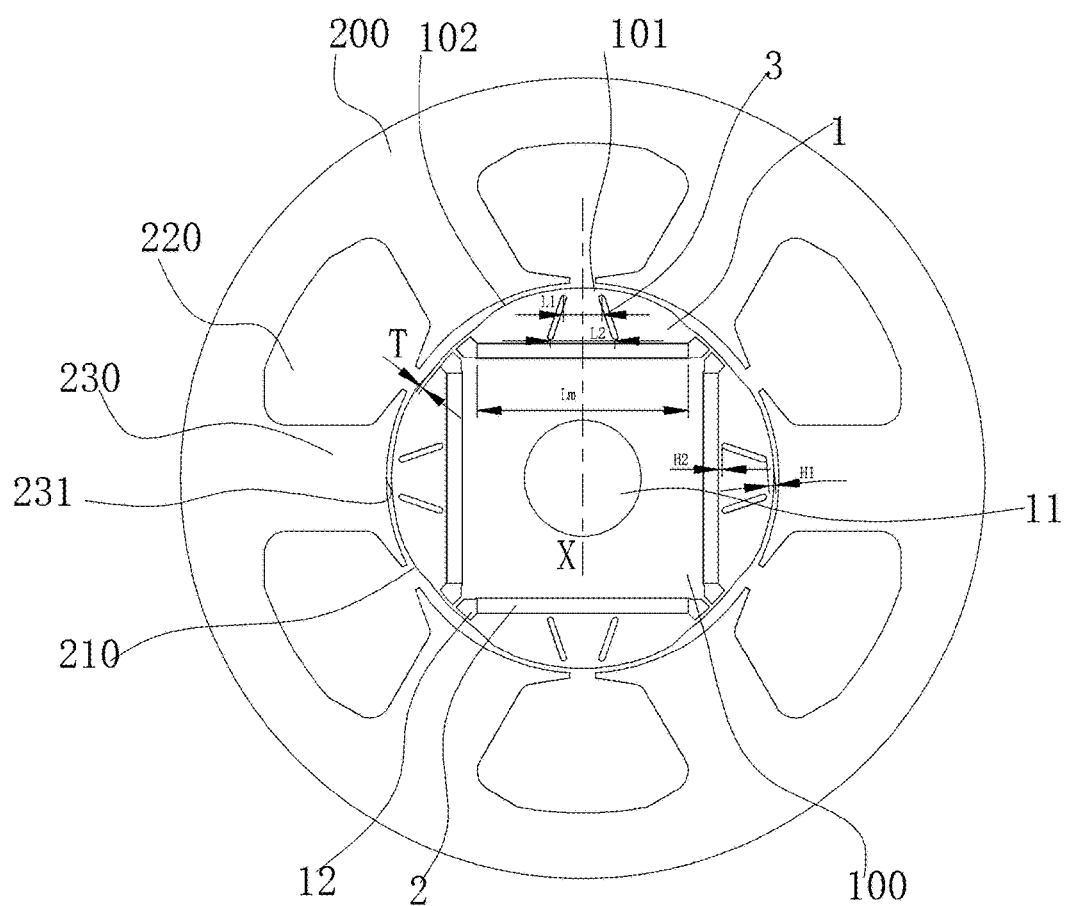
FIG. 2 is a schematic view of an electric motor according to another embodiment of the present disclosure.

As shown in FIGS. 1 and 2, the rotor body 1 is provided with a rotor bore 11 and a plurality of magnetic steel slots 12 surrounding the rotor bore 11, and an outer contour of the rotor body 1 includes a plurality of concentric arc segments 101 in concentric with the rotor bore 11 and a plurality of connecting line segments 102 connecting adjacent concentric arc segments 101. The plurality of concentric arc segments 101 are respectively corresponding to the plurality of magnetic steel slots 12 in a radial direction of the rotor body 1, and the connecting line segment 102 includes at least one straight line segment 1021, in which an included angle between a central normal line of each straight line segment 1021 and a connecting line between a midpoint of the straight line segment and a center of the rotor bore 11 is denoted as β, and 0°≤β≤20°. Herein, the central normal line refers to a normal line passing through the midpoint of the straight line segment 1021 and perpendicular to the straight line segment 1021. In some alternative embodiments, the central normal line of each straight line segment 1021 passes through the center of the rotor bore 11, that is, the connecting line between the midpoint of the straight line segment 1021 and the center of circle is perpendicular to the straight line segment 1021, and moreover, a vertical distance between the center of the rotor bore 11 and the connecting line segment 102 is smaller than a radius of the concentric arc segment 101. Alternatively, the connecting line segment 102 includes at least two straight line segments 1021.

At least one magnetic steel bar 2 is disposed in each magnetic steel slot 12. In an example shown in FIGS. 1 and 2, the magnetic steel slot 12 has an elongated shape and is perpendicular to a connecting line X between a midpoint of the concentric arc segment 101 and the center of rotor bore 11, and each magnetic steel slot 12 has one magnetic steel bar 2 therein. In the subsequent description of the present disclosure, the magnetic steel slot 12 in such a shape may be elaborated as an example. Certainly, the present disclosure is not limited thereto. In some other examples, the magnetic steel slot 12 may be formed as a V-shaped slot with an opening towards an outer edge of the rotor body, and in which case two spaced magnetic steel bars may be placed in the magnetic steel slot 12 (not illustrated).

For the electric motor rotor 100 according to embodiments of the present disclosure, since the outer contour of the rotor body 1 includes the plurality of concentric arc segments 101 and the plurality of connecting line segments 102 connecting adjacent concentric arc segments 101, a harmonic content of a back electromotive force of the electric motor may be decreased, and a cogging torque and an electromagnetic torque ripple thereof may be reduced.

According to some embodiments of the present disclosure, a central angle α of the concentric arc segment 101 satisfies a formula: α=360/P*θ, in which P represents the number of rotor poles, and 0<θ≤0.8, or further 0.4≤θ≤0.8.

In the example shown in FIGS. 1 and 2, a magnetic bridge 13 is defined between two ends of each magnetic steel slot 12 and the connecting line segment 102 adjacent to the ends of the magnetic steel slot 12, and a thickness T of the magnetic bridge 13 has a range of 0.3 mm≤T≤1.0 mm. The connecting line of the magnetic bridge at q-axis position may be connected by straight line segments, in which the term "q-axis" mentioned in the specification of the present disclosure is well known to those skilled in the art and thus will not be elaborated herein.

In some embodiments, as shown in FIGS. 1 and 2, a plurality of slits 3 are formed between the magnetic steel slot 12 and its corresponding concentric arc segment 101, and are spaced apart from one another. By providing the slits 3, it is possible to reduce a quadrature axis inductance and a capacity of the electric motor, thus lowering the cost.

Alternatively, the plurality of slits 3 is symmetrical relative to the connecting line X between the midpoint of the concentric arc segment 101 and the center of the rotor bore 11, and for example, FIGS. 1 and 2 show one connecting line X between the midpoint of the concentric arc segment 101 and the center of rotor bore 11. In an example, the number of the slits 3 may be an odd number greater than or equal to three, in which case the slit 3 located at the center is symmetrical per se with respect to the connecting line X, while rest of slits 3 are located at both sides of the connecting line X and are symmetrical with respect to the connecting line X. In another example, the number of the slits 3 may be an even number, in which case an even number of slits 3 are divided into two parts by the connecting line X, and the two parts located at both sides of the connecting line X are symmetrical with respect to the connecting line X.

The electric motor rotor according to the present disclosure will be described by way of an example where two spaced slits 3 are provided between the magnetic steel slot 12 and its corresponding concentric arc segment 101.

In an embodiment shown in FIG. 1, two slits 3 are both parallel to the connecting line X between the midpoint of the concentric arc segment 101 and the center of rotor bore 11. The two slits 3 between the magnetic steel slot 12 and its corresponding concentric arc segment 101 located in an upper part of FIG. 1 are taken as an example, in which the magnetic steel slot 12 is horizontally disposed, and the two slits 3 are perpendicular to the magnetic steel slot 12. A distance L between the two slits 3 and a distance Lm between two ends of the magnetic steel bar 2 in the magnetic steel slot 12 satisfy L=Lm*k, in which 0.2≤k≤0.8.

Alternatively, a distance between a first end of the slit 3 adjacent to the concentric arc segment 101 and the concentric arc segment 101 is denoted as H1, and a distance between a second end of the slit 3 adjacent to the magnetic steel slot 12 and the magnetic steel slot 12 is denoted as H2, in which 0.3 mm≤H1≤0.6 mm, 0.3 mm≤H2≤0.6 mm, and alternatively H1=H2.

In an embodiment shown in FIG. 2, respective first ends of the two slits 3 adjacent to the concentric arc segment 101 are inclined towards the connecting line X between the midpoint of the concentric arc segment 101 and the center of rotor bore 11. A distance between the respective first ends of the two slits 3 adjacent to the concentric arc segment 101 is denoted as L1, and a distance between the respective second ends of the two slits 3 adjacent to the magnetic steel slot 12 is denoted as L2, in which 0.5≤L1/L2≤0.8. Further, as shown in FIG. 2, the distance Lm between the two ends of the magnetic steel bar 2 in the magnetic steel slot 12 satisfies a formula: L2=Lm*k, in which 0.2≤k≤0.8. Thus, the design of the slit 3 is simple and convenient.

Likewise, in this embodiment, alternatively, the distance between the first end of the slit 3 adjacent to the concentric arc segment 101 and the concentric arc segment 101 is denoted as H1, and the distance between the second end of the slit 3 adjacent to the magnetic steel slot 12 and the magnetic steel slot 12 is denoted as H2, in which 0.3 mm≤H1≤0.6 mm, 0.3 mm≤H2≤0.6 mm, and alternatively H1=H2.

For the electric motor rotor according to embodiments of the present disclosure, the outer contour of the rotor body includes the plurality of concentric arc segments and the plurality of connecting line segments, and the slits are provided between the magnetic steel slot and its corresponding concentric arc segment, so that it is possible to suppress tooth harmonics and reduce electromagnetic vibration of the electric motor.

An electric motor according to embodiments of a second aspect of the present disclosure includes: an electric motor stator 200 and an electric motor rotor 100, in which the electric motor rotor may be configured as the electric motor rotor according to the embodiments of the first aspect of the present disclosure. As shown in FIGS. 1 and 2, the electric motor stator 200 is provided with a stator bore 210 and a plurality of stator slots 220 surrounding the stator bore 210, the stator slots 220 are in communication with the stator bore 210, and a stator tooth 230 is defined between adjacent stator slots 220. The electric motor rotor 100 is rotatably disposed in the stator bore 210, and the rotor bore 11 is in concentric with the stator bore 210.

Since the electric motor according to embodiments of the present disclosure includes the electric motor rotor described in the above embodiments, the harmonic content of the back electromotive force of the electric motor may be decreased, and the cogging torque and the electromagnetic torque ripple of the electric motor may be reduced; additionally, the harmonic content of the back electromotive force and the quadrature axis inductance of the electric motor are decreased; and furthermore, the tooth harmonics may be suppressed, thereby reducing the electromagnetic vibration of the electric motor.

In some embodiments of the present disclosure, a radially inner end face 231 of the stator tooth 230 is formed as an arc end face in concentric with a center of the stator bore 210. Therefore, on the premise of reducing the cogging torque and the electromagnetic torque ripple of the electric motor, a slot area of the electric motor is not decreased, such that the number of winding turns does not need to be reduced, thereby improving an efficiency of the electric motor.

The number S of stator slots 220 and the number P of rotor poles of the electric motor rotor 100 satisfy P/S=2/3. That is, the above electric motor rotor according to the present disclosure is also suitable for other electric motors satisfying the requirement of P/S=2/3, such as an electric motor having six rotor poles and nine stator slots or having eight rotor poles and twelve stator slots, in addition to the electric motor having four rotor poles and six stator slots shown in FIGS. 1 and 2.

Other structures and operations of the electric motor according to embodiments of the present disclosure are known to those skilled in the art, and thus will not be elaborated herein.

Reference throughout this specification to "an embodiment," "some embodiments," "exemplary embodiment," "an example," "specific examples," or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. Those skilled in the art can integrate and combine different embodiments or examples and the features in different embodiments or examples in the specification under circumstance without contradiction.

Although embodiments of the present disclosure have been shown and illustrated, it should be understood by those skilled in the art that various changes, modifications, alternatives and variants without departing from the principle and spirit of the present disclosure are acceptable. The scope of the present disclosure is defined by claims and the like.

What is claimed is:

1. An electric motor rotor, comprising:
   a rotor body provided with a rotor bore and a plurality of magnetic steel slots surrounding the rotor bore,
      wherein an outer contour of the rotor body comprises a plurality of concentric arc segments in concentric with the rotor bore and a connecting line segment connecting two adjacent concentric arc segments of the plurality of concentric arc segments,
      wherein each of the plurality of concentric arc segments correspond to a corresponding magnetic steel slot of the plurality of magnetic steel slots in a radial direction from a center of the rotor bore,
      wherein the connecting line segment comprises at least two straight line segments continuous to each other, and
      wherein for each straight line segment, an included angle β is defined between:
         a central normal line being a normal line passing through a midpoint of said each straight line segment and perpendicular to said each straight line segment; and
         a connecting line between the midpoint of said each straight line segment and the center of the rotor bore, and
      wherein the included angle β is greater than 0° and smaller than or equal to 20°; and
   at least one magnetic steel bar arranged in each of the plurality of magnetic steel slots.

2. The electric motor rotor according to claim 1, wherein a central angle α of each of the plurality of concentric arc segments satisfies α=360/P*θ, in which P represents a number of rotor poles of the electric motor rotor, and 0<θ≤0.8.

3. The electric motor rotor according to claim 1, wherein a magnetic bridge is defined between adjacent ends of adjacent magnetic steel slots of the plurality of magnetic steel slots and the connecting line segment adjacent to the adjacent ends of the adjacent magnetic steel slots of the plurality of magnetic steel slots, and wherein a thickness T of the magnetic bridge has a range of 0.3 mm≤T≤1.0 mm.

4. The electric motor rotor according to claim 1, wherein the rotor body is provided with a plurality of slits formed between the each of the plurality of concentric arc segments and the corresponding magnetic steel slot, wherein each of the plurality of slits are spaced apart from each other.

5. The electric motor rotor according to claim 4, wherein the plurality of slits are provided symmetrical relative to a connecting line between a midpoint of the each of the plurality of concentric arc segments and the center of the rotor bore.

6. The electric motor rotor according to claim 4, wherein a number of the plurality of slits formed between the each of the plurality of concentric arc segments and the corresponding magnetic steel slot is two.

7. The electric motor rotor according to claim 6, wherein the two slits are both parallel to the connecting line between the midpoint of the each of the plurality of concentric arc segments and the center of the rotor bore.

8. The electric motor rotor according to claim 7, wherein a distance L between the two slits and a distance Lm between two ends of one of the at least one magnetic steel bar in the corresponding magnetic steel slot satisfy L=Lm*k, in which 0.2≤k≤0.8.

9. The electric motor rotor according to claim 6, wherein respective first ends of the two slits adjacent to the each of the plurality of concentric arc segments are inclined towards a connecting line between a midpoint of the each of the plurality of concentric arc segments and the center of the rotor bore.

10. The electric motor rotor according to claim 9, wherein a distance between the respective first ends of the two slits adjacent to the each of the plurality of concentric arc segments is denoted as L1, and a distance between respective second ends of the two slits adjacent to the corresponding magnetic steel slot is denoted as L2, in which 0.5≤L1/L2≤0.8.

11. The electric motor rotor according to claim 10,
wherein a distance Lm between two ends of one of the at least one magnetic steel bar in the corresponding magnetic steel slot satisfies L2=Lm*k, in which 0.2≤k≤0.8.

12. The electric motor rotor according to claim 4,
wherein a distance between a first end of one of the plurality of slits adjacent to the each of the plurality of concentric arc segments and the each of the plurality of concentric arc segments is denoted as H1, and a distance between a second end of the slit adjacent to the corresponding magnetic steel slot and the corresponding magnetic steel slot is denoted as H2, in which 0.3 mm≤H1≤0.6 mm and 0.3 mm≤H2≤0.6 mm.

13. The electric motor rotor according to claim 1,
wherein the each of the plurality of concentric arc segments and the corresponding magnetic steel slot of the plurality of magnetic steel slots are arranged such that the corresponding magnetic steel slot is elongated in a direction perpendicular to a connecting line between a midpoint of the each of the plurality of concentric arc segments and the center of the rotor bore.

14. An electric motor, comprising:
an electric motor stator provided with a stator bore and a plurality of stator slots surrounding the stator bore, wherein the plurality of stator slots are in communication with the stator bore, and wherein a stator tooth is defined between adjacent stator slots of the plurality of stator slots; and
an electric motor rotor comprising:
a rotor body provided with a rotor bore and a plurality of magnetic steel slots surrounding the rotor bore,
wherein an outer contour of the rotor body comprises a plurality of concentric arc segments in concentric with the rotor bore and a connecting line segment connecting two adjacent concentric arc segments of the plurality of concentric arc segments,
wherein each of the plurality of concentric arc segments correspond to a corresponding magnetic steel slot of the plurality of magnetic steel slots in a radial direction from a center of the rotor bore,
wherein the connecting line segment comprises at least two straight line segments continuous to each other, and
wherein for each straight line segment, an included angle β is defined between:
a central normal line being a normal line passing through a midpoint of said each straight line segment and perpendicular to said each straight line segment; and
a connecting line between the midpoint of said each straight line segment and a center of the rotor bore, and
wherein the included angle β is greater than 0° and smaller than or equal to 20°; and
at least one magnetic steel bar arranged in each of the plurality of magnetic steel slots.

15. The electric motor according to claim 14,
wherein a radially inner end face of the stator tooth is formed as an arc end face concentric with a center of the stator bore.

16. The electric motor according to claim 14,
wherein a number S of the plurality of stator slots and a number P of a plurality of rotor poles of the electric motor rotor satisfy P/S=2/3.

17. The electric motor according to claim 14,
wherein a central angle α of each of the plurality of concentric arc segments satisfies α=360/P*θ, in which P represents a number of rotor poles of the electric motor rotor, and 0<θ≤0.8.

18. The electric motor according to claim 14,
wherein a magnetic bridge is defined between adjacent ends of adjacent magnetic steel slots of the plurality of magnetic steel slots and the connecting line segment adjacent to the adjacent end of the adjacent magnetic steel slots of the plurality of magnetic steel slots, and
wherein a thickness T of the magnetic bridge has a range of 0.3 mm≤T≤1.0 mm.

* * * * *

UNITED STATES PATENT AND TRADEMARK OFFICE
CERTIFICATE OF CORRECTION

| | | |
|---|---|---|
| PATENT NO. | : 10,411,536 B2 | Page 1 of 1 |
| APPLICATION NO. | : 15/328940 | |
| DATED | : September 10, 2019 | |
| INVENTOR(S) | : Guangming Peng et al. | |

It is certified that error appears in the above-identified patent and that said Letters Patent is hereby corrected as shown below:

On the Title Page

Item (73) Assignee should read:
GUANGDONG WELLING MOTOR MANUFACTURING CO., LTD.,
Foshan (CN)

MIDEA WELLING MOTOR TECHNOLOGY (SHANGHAI) CO., LTD.,
Shanghai (CN)

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*